(12) United States Patent
Kubota et al.

(10) Patent No.: US 8,693,045 B2
(45) Date of Patent: Apr. 8, 2014

(54) PRINTING CONTROL DEVICE AND PRINTING CONTROL METHOD

(75) Inventors: Masaru Kubota, Omi-mura (JP); Kazunobu Nimura, Tatsuno-match (JP)

(73) Assignee: Seiko Epson Corporation, Tokyo (JP)

( * ) Notice: Subject to any disclaimer, the term of this patent is extended or adjusted under 35 U.S.C. 154(b) by 37 days.

(21) Appl. No.: 13/591,146

(22) Filed: Aug. 21, 2012

(65) Prior Publication Data

US 2013/0050716 A1  Feb. 28, 2013

(30) Foreign Application Priority Data

Aug. 23, 2011 (JP) ................................. 2011-181296

(51) Int. Cl.
*G06F 15/00* (2006.01)
*G06K 1/00* (2006.01)
*G06K 15/02* (2006.01)
*H04N 1/60* (2006.01)

(52) U.S. Cl.
USPC ........................................... 358/1.2; 358/1.9

(58) Field of Classification Search
None
See application file for complete search history.

(56) References Cited

U.S. PATENT DOCUMENTS

2003/0090559 A1* 5/2003 Okano et al. .................. 347/131
2010/0259795 A1* 10/2010 Loce et al. .................... 358/3.27

FOREIGN PATENT DOCUMENTS

JP  2007-160897 A  6/2007

* cited by examiner

*Primary Examiner* — Douglas Tran
(74) *Attorney, Agent, or Firm* — Kilpatrick Townsend & Stockton LLP

(57) ABSTRACT

A printing control device which includes a printing density determination unit which obtains attribute information of an object included in input document data, and determines a printing density for printing the object according to the line width of an image of the object for which attribute information is a line drawing attribute.

14 Claims, 5 Drawing Sheets

PRINTING CONTROL DEVICE AND PRINTING CONTROL METHOD

CROSS REFERENCES TO RELATED APPLICATIONS

The entire disclosure of Japanese Patent Application No. 2011-181296, filed Aug. 23, 2011 is expressly incorporated by reference herein.

BACKGROUND

1. Technical Field

The present invention relates to a printing control device and a printing control method.

2. Related Art

In an ink jet printer in which an image such as a document is transferred to a sheet by ejecting ink droplets, when images are printed on both surfaces of front and rear surfaces of one sheet, one surface is printed, and then the other surface is printed by reversing the sheet in the printer without performing discharging. At this time, when a printing operation on the other surface is performed in a state where ink on one surface has not dried, there is a case in which the ink is attached to a roller or the like which comes into contact with the sheet, and the sheet is contaminated when being transported. Accordingly, it is necessary to print the other surface after waiting until the ink which has been ejected to print one surface of the sheet, has dried, and as a result, printing throughput is reduced since it takes time to dry the ink.

An ink jet recording device has been proposed in JP-A-2007-160897 in which an image other than character information is printed with a lower density than the character information, and a time required for drying ink is shortened in order to cope with such a problem.

However, there is a problem in that visibility is reduced when an image to be printed includes a ruled line, an underline of characters, a strikeout, or the like, since these are printed with a low density compared to the characters.

SUMMARY

An advantage of some aspects of the invention is to provide a printing control device which improves visibility of a printed image without reducing printing throughput.

The invention can be realized in the following forms or Application Examples.

Application Example 1

According to Application Example 1, there is provided a printing control device which includes a printing density determination unit which obtains attribute information of an object which is included in input document data, and determines a printing density for printing the object according to the line width of an image of the object for which the attribute information is a line drawing attribute.

With this configuration, when the attribute information of the object included in the input document data is the line drawing attribute, since the printing density for printing is determined according to the line width of the image of the object, it is possible to improve visibility without reducing printing throughput by determining an appropriate printing density according to the line width.

Application Example 2

In the printing control device according to Application Example 1, it is preferable that the printing density determination unit determine the printing density of the object for which the attribute information is a character attribute, as a first density, and determine the printing density of the object for which the attribute information is the line drawing attribute, and the line width thereof is more than a certain value, as a second density which is lower than the first density.

With this configuration, it is possible to shorten a drying time of ink after printing by making the printing density of the object, for which the attribute information is the line drawing attribute, and the line width thereof is more than a certain value, lower than the density of the character attribute.

Application Example 3

In the printing control device according to Application Example 2, it is preferable that the printing density determination unit determines the printing density of the object for which the attribute information is the line drawing attribute, and the line width does not exceed a certain value as the first density.

With such a configuration, when it is a thin line of which the line width does not exceed a certain value, it is possible to improve the visibility since the density thereof is determined as the density of the character attribute.

Application Example 4

In the printing control device according to Application Example 3, the printing density determination unit may rewrite the attribute information of the object for which the attribute information is the line drawing attribute, and the line width does not exceed a certain value to the character attribute from the line drawing attribute.

Application Example 5

In the printing control device according to Example 2, the printing density determination unit may determine the printing density of the object for which the attribute information is the line drawing attribute, and the line width does not exceed a certain value as a third density which is lower than the first density, and is higher than the second density.

Application Example 6

In the printing control device according to Application Example 1, the image of the object as the line drawing attribute may be a ruled line, an underline of characters, or a strikeout.

Application Example 7

In the printing control device according to Application Example 2, the printing density obtaining unit may determine the printing density for printing the object according to a size of the character of the image of the object of which the obtained attribute information is the character attribute.

Application Example 8

In the printing control device according to Application Example 2, it is preferable that the printing density determination unit determines the printing density of the object for which the attribute information is the character attribute, and a size of the character is more than a certain value as the second density.

With such a configuration, it is possible to shorten a drying time of ink after printing by making the density low, when the size of the character exceeds a certain value.

Application Example 9

In the printing control device according to Application Example 8, the printing density determination unit may rewrite the attribute information of the object for which the attribute information is the character attribute, and the size of the character exceeds a certain value, to the line drawing attribute from the character attribute.

Application Example 10

In the printing control device according to Application Example 1, it is preferable that the printing density determination unit operate with respect to the document data to be printed on both surfaces of a printing medium.

With such a configuration, it is possible to improve the printing throughput, since the drying time during which one surface is printed, and the wait until the printing on the other surface is started can be shortened.

Application Example 11

In the printing control device according to Application Example 1, the printing density determination unit may determine the number of dots, or a size of dots which draw one pixel of the image on the basis of the determined printing density.

Application Example 12

In the printing control device according to Application Example 1, the printing density determination unit may include a gray value setting unit which sets a gray value corresponding to the printing density.

Application Example 13

In the printing control device according to Application Example 1, printing data which can be printed in an ink jet printer may be generated.

Application Example 14

According to some aspects of the invention, there is provided a printing control method which includes, obtaining attribute information of an object which is included in input document data; obtaining information relating to the line width of an image of the object, when the obtained attribute information is a line drawing attribute; and determining a printing density for printing according to the obtained line width.

According to such a method, it is possible to improve visibility without reducing printing throughput by determining an appropriate printing density according to the line width, since the printing density to be printed is determined according to the line width of an image of the object, when attribute information of the object included in the input document data is the line drawing attribute.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments will be described with reference to drawings.

Embodiments

Figure 1:
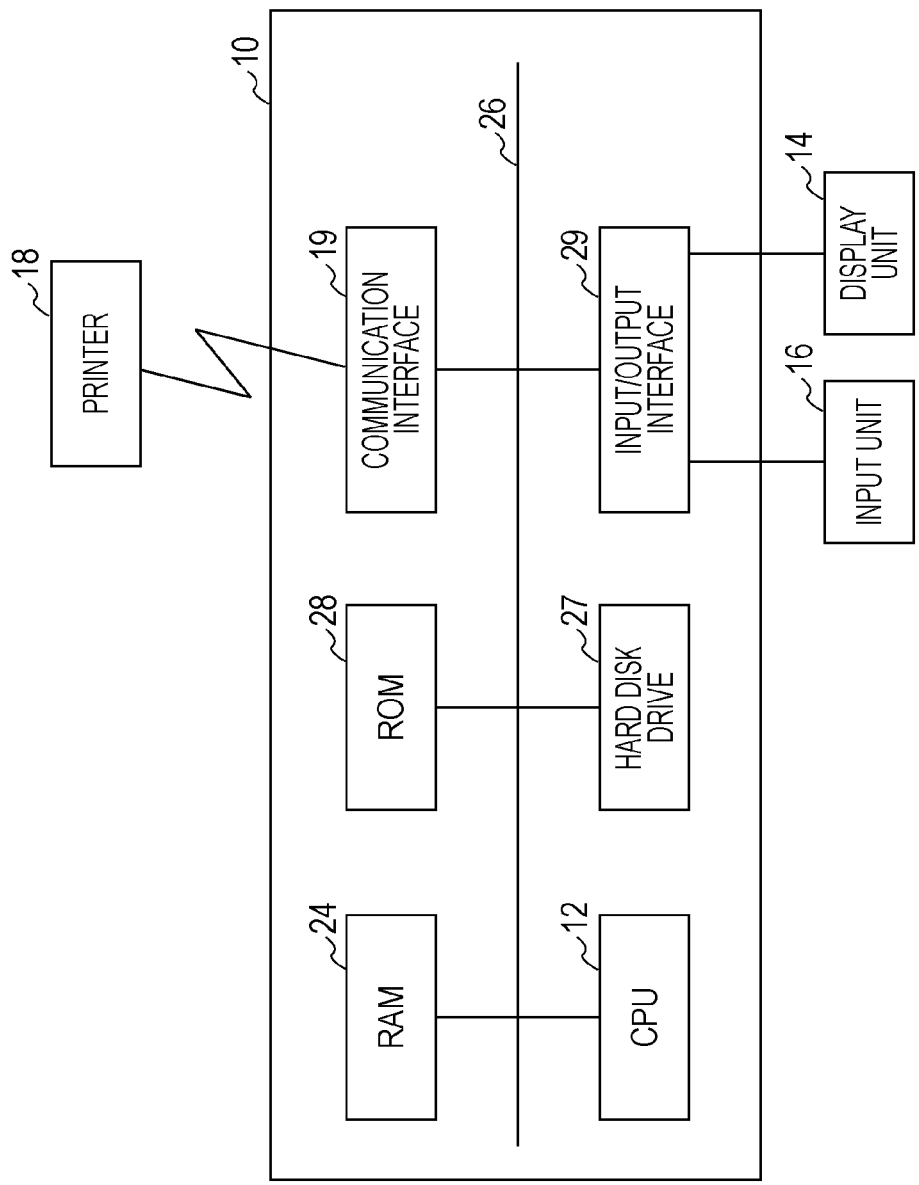
FIG. 1 is a configuration diagram of hardware of a computer.

FIG. 1 is a configuration diagram of hardware of a computer 10. The computer 10 is assumed as a so-called personal computer, and includes a central processing unit (CPU) 12, a random access memory (RAM) 24, a read only memory (ROM) 28, a hard disk drive 27, a communication interface 19, and an I/O interface 29. These are connected to each other through a bus 26.

In addition, the I/O interface 29 is connected with an input unit 16 such as a keyboard, or a mouse, and a display unit 14 such as a display unit. In addition, the communication interface 19 is assumed as a network such as a LAN (Local Area Network), or a bus such as a USB (Universal Serial Bus), and is connected to a printer 18 to be able to communicate therewith. In addition, in the embodiment, the printer 18 is assumed as an ink jet printer.

Figure 2:
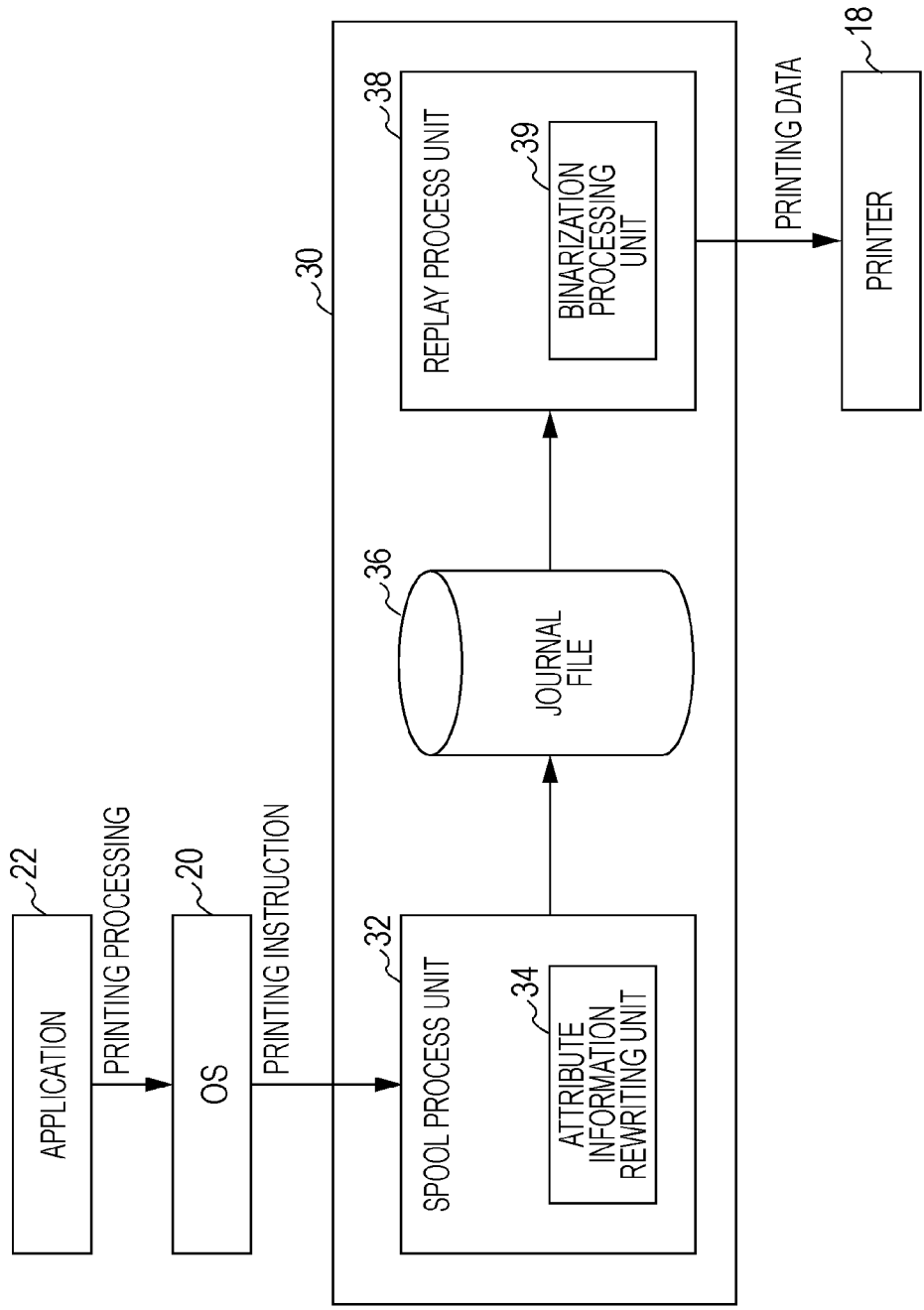
FIG. 2 is a block diagram which shows a configuration of a printer driver.

Each function of the computer 10 is controlled by system software which is referred to as an operating system (OS) 20 (FIG. 2). In addition, software such as an application 22 (FIG. 2) for creating a document, or a printer driver 30 (FIG. 2) for performing printing in the printer 18 is installed in advance in the computer 10, and are respectively executed under control of the OS 20.

FIG. 2 is a block diagram which shows a configuration of the printer driver 30. The printer driver 30, which functions as a printing control device, creates job data (printing data) for printing an image of a document created and edited on the computer 10 in the printer 18.

The printer driver 30 includes a spool process unit 32 and a replay process unit 38. In addition, the spool process unit 32 includes an attribute information rewriting unit 34. Further, the replay process unit 38 includes a binary processing unit 39. In addition, the respective functions of these functional units are executed when the above described hardware, and the software which is stored in the hard disk drive 27, and is loaded into the RAM 24 or the like operate together. In addition, the attribute information rewriting unit 34 and the binary processing unit 39 configure a printing density determination unit.

In FIG. 2, when a user instructs printing of a document using the application 22, the application 22 performs printing processing with respect to the OS 20. As a result, a printing instruction such as a drawing instruction from the OS 20 is sent to the printer driver 30 in a unit of a page.

The spool process unit 32 converts the printing instruction which is sent from the OS 20 to an intermediate spool, and stores the converted result in a journal file 36. At this time, the attribute information rewriting unit 34 obtains attribute information of the printing instruction. Here, the attribute information shows whether a drawing target to be drawn by the printing instruction (object) is a line drawing attribute, or a character attribute. Here, the line drawing attribute corresponds to a ruled line of a table, an underline of characters, a strikeout, or the like. In addition, according to the embodiment, when the drawing target is an image such as a photograph, the drawing target is separately treated as an image attribute.

When the drawing target has the line drawing attribute, the attribute information rewriting unit 34 further obtains information relating to the line width to be drawn, and compares a value of the obtained line width to a reference value. As a compared result, when the obtained line width does not exceed the reference value, the attribute information rewriting unit 34 rewrites the attribute information to the character attribute. Here, the rewritten attribute information is reflected to the journal file 36.

In addition, rewriting of the attribute information according to the above described attribute information rewriting unit 34 may be limited to a case where a predetermined printing setting is instructed from the application 22. That is, the rewriting may be limited to a case where there is an instruction of both surface printing for instructing printing on both surfaces of a printing medium, or an instruction of allocation printing for printing a plurality of pages on one surface of the printing medium. In addition, the rewriting may be limited to a case where a user explicitly instructs the rewriting from a set screen of the printer driver 30 (not shown).

The spool process unit 32 stores the entire printing instruction which is sent from the OS 20 in the journal file 36. At this stage, the application 22 is released from the printing processing.

The replay process unit 38 sequentially reads the printing instruction stored in the journal file 36, and generates RGB data on the basis of the printing instruction. The binary processing unit 39 performs color conversion processing, binary processing, halftone processing, or the like with respect to the generated RGB data, and converts the RGB data to raster data which shows ink ejection information for each pixel. In addition, the raster data includes information which denotes ON/OFF of each ink color such as CMYK, or information denotes a size of each of ink droplets.

The binary processing unit 39 changes gradation of printing according to the attribute information of each pixel when performing the binary processing. That is, when the attribute information is the character attribute, the density A (a first density) of a certain value is defined. In contrast to this, when the attribute information is the line drawing attribute, and the line width of an image as a drawing target is a thick line which is thicker than a predetermined reference value (a certain value), the density C (a second density) which is lower (lighter) than the density A is determined. In addition, when the line width is a thin line not exceeding the reference value, the density is set to the density A which is the same as that of the character attribute.

In addition, the replay process unit 38 may determine the number of dots of ink droplets which draw one pixel on the basis of the determined density, or may determine the size of dots of the ink droplets.

Further, the replay process unit 38 generates the printing data including the raster data which is created by the above processing, and a control instruction for controlling the operation or the like of the printer 18, and sends the data to the printer 18. In addition, the printing data may be sent to the printer 18 through a spooler which is not shown in the drawing.

Figure 3:
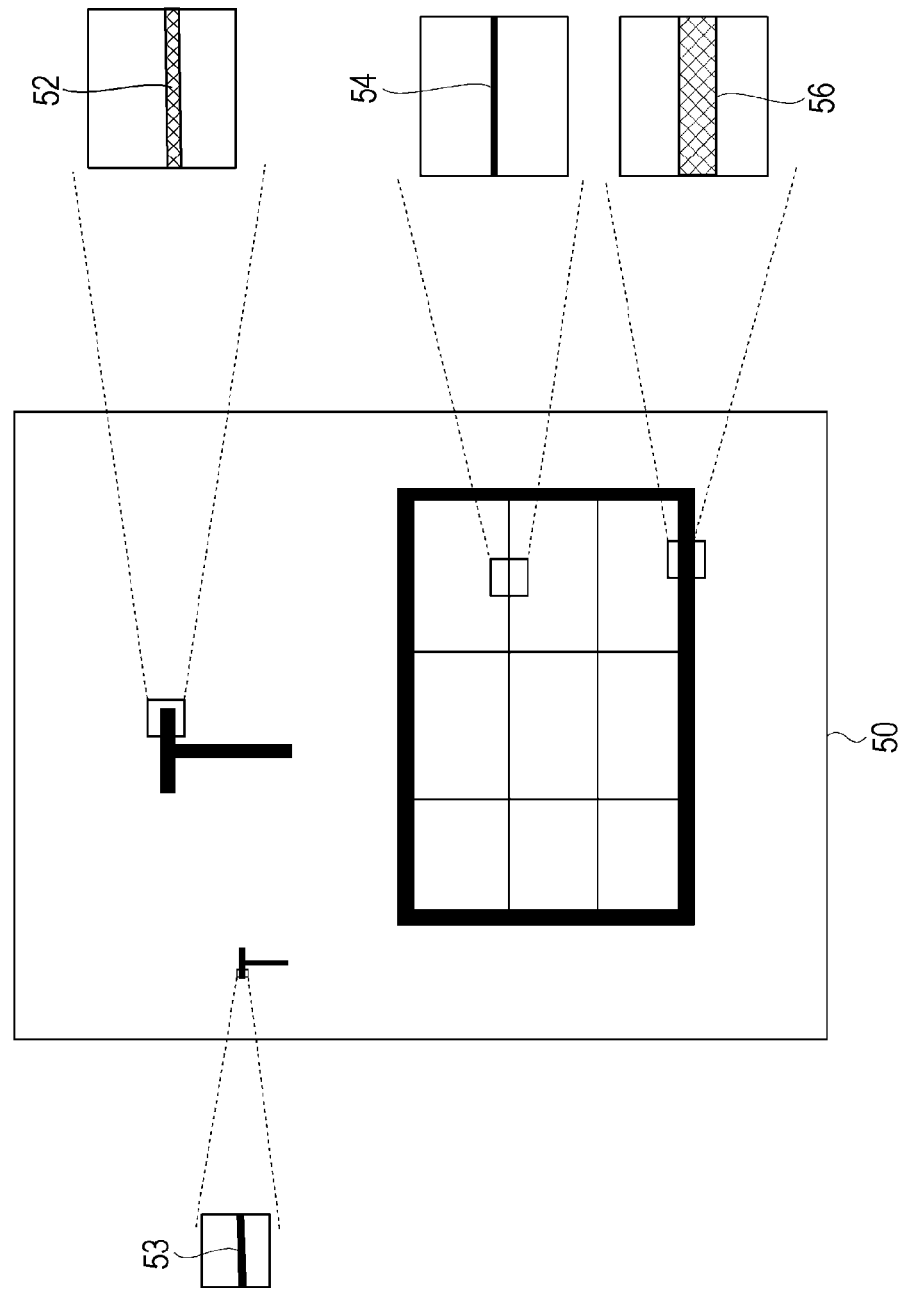
FIG. 3 is a diagram which shows a printing result.

FIG. 3 is an example of a printing result which is printed in the printer 18. As shown in FIG. 3, in a case of a document image in which a character image and a line drawing image are mixed, a thick ruled line 56 is printed with the lower density than a small character 53 on a sheet 50 as a printing medium, and a thin ruled line 54 is printed with substantially the same density as that of the small character 53 on the sheet 50. In addition, a large character 52 is printed with substantially the same density as that of the thick ruled line 56 on the sheet 50.

In addition, according to the embodiment, when the line width of the line drawing attribute is thin, the attribute information rewriting unit 34 determines the density as the density A which is the same as that of the character attribute by rewriting the attribute information as the character attribute, however, it is not limited to this. That is, when the line width of the line drawing attribute is thin, it may be rewritten as a third attribute which is different from the character attribute and the line drawing attribute. In addition, the binary processing unit 39 may determine a density B (a third density) which is higher than the density C, and is lower than the density A when the attribute information is the third attribute.

According to the embodiment, the gray values of the densities A, B, and C are assumed to be defined as certain values in the printer driver 30 as design data, however, it is possible to assume that the printer driver 30 includes a gray value setting unit (not shown) as the user interface for setting a degree of the gradation of each density, and a user explicitly instructs the gray value using a numerical value or the like.

Figure 4:
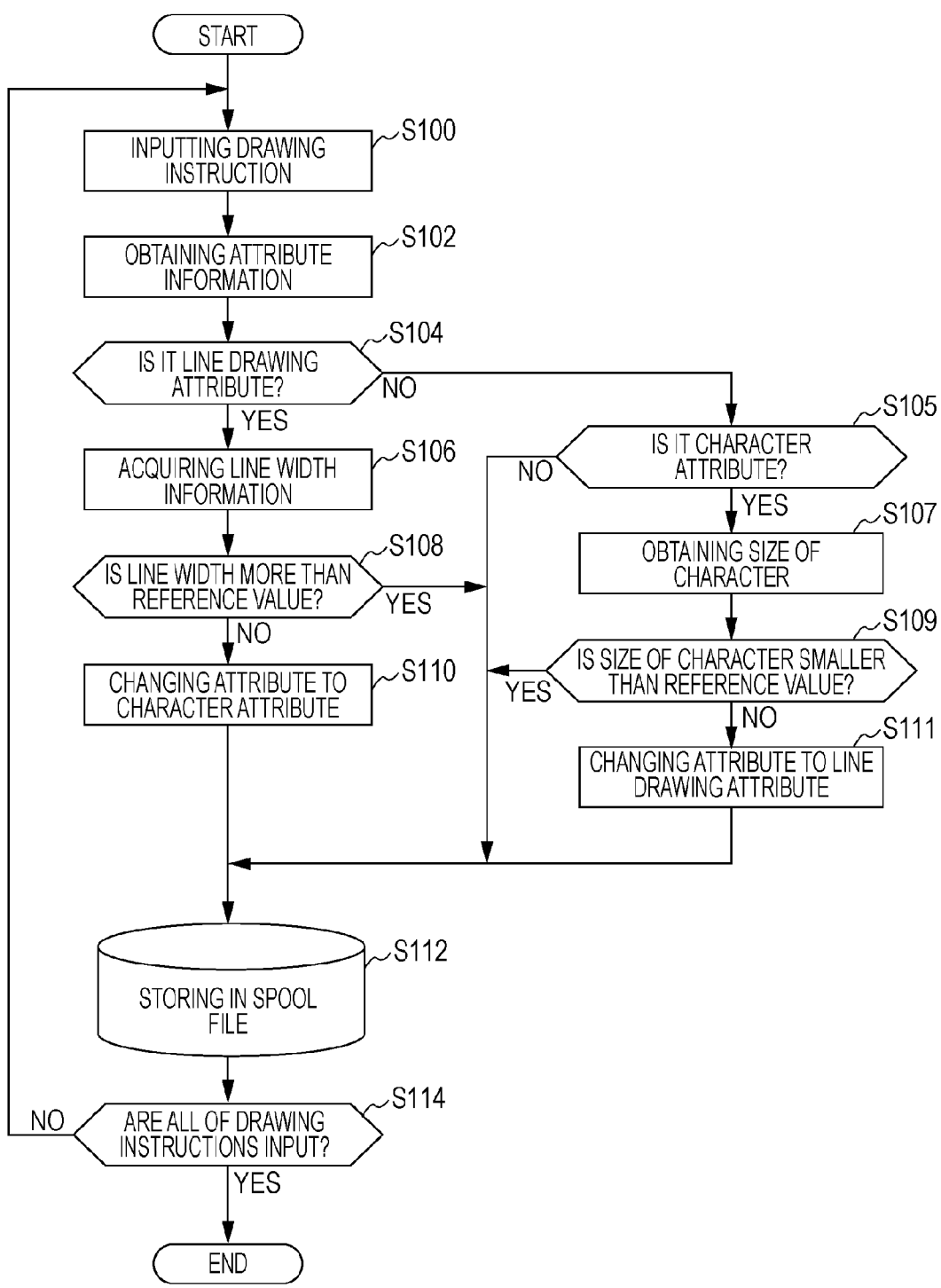
FIG. 4 is a flowchart which shows a flow of a spool process.

FIG. 4 is a flowchart which shows a flow of processing of the spool process unit 32. When the processing is started, one drawing instruction is input to the spool process unit 32 (step S100).

Subsequently, the spool process unit 32 obtains the attribute information which is attached to the drawing instruction (step S102) <obtaining attribute information>.

Subsequently, the spool process unit 32 determines whether or not the drawing target of the drawing instruction from the attribute information is the line drawing attribute (step S104).

Here, when the drawing target of the drawing instruction is determined as the line drawing attribute (Yes in step S104), the spool process unit 32 obtains information of the line width to be drawn using the drawing instruction (step S106) <obtaining line width>.

Subsequently, the spool process unit 32 compares the line width to the reference value, and determines whether or not the line width exceeds the reference value (for example, 7 points) (step S108).

Here, when it is determined that the line width does not exceed the reference value (No in step S108), the spool process unit 32 rewrites the attribute information of the drawing instruction as the character attribute (step S110), and proceeds to step S112.

In addition, when it is determined that the drawing target of the drawing instruction is not the line drawing attribute in step S104 (No), the spool process unit 32 determines whether or not the drawing target of the drawing instruction is the character attribute from the attribute information (step S105).

Here, when it is determined that the drawing target is the character attribute (Yes in step S105), the spool process unit 32 obtains information of a size of the character to be drawn using the drawing instruction (step S107).

Here, when it is determined whether or not the obtained size of the character is smaller than the reference value (step S109), and the size of the character is larger than the reference value (No in step S109), the spool process unit 32 rewrites the attribute information of the drawing instruction as the line drawing attribute (step S111), and proceeds to step S112.

In addition, all of a case where it is determined that the drawing target is not the character attribute (No) in step S105, a case where it is determined that the line width exceeds the reference value in step S108 (Yes), or a case where it is determined that the size of the character is smaller than the reference value in step S109 (Yes), proceed to step S112.

In step S112, the spool process unit 32 stores the drawing instruction in a spool file together with the attribute information.

Subsequently, the spool process unit 32 determines whether or not all of the drawing commands are input (step S114).

Here, when it is determined that all of the drawing commands are not input (No in step S114), the procedure returns to step S100, and the next instruction is input. On the other hand, when it is determined that all of the drawing commands are input (Yes in step S114), a series of processes of the spool process unit 32 is ended.

Figure 5:
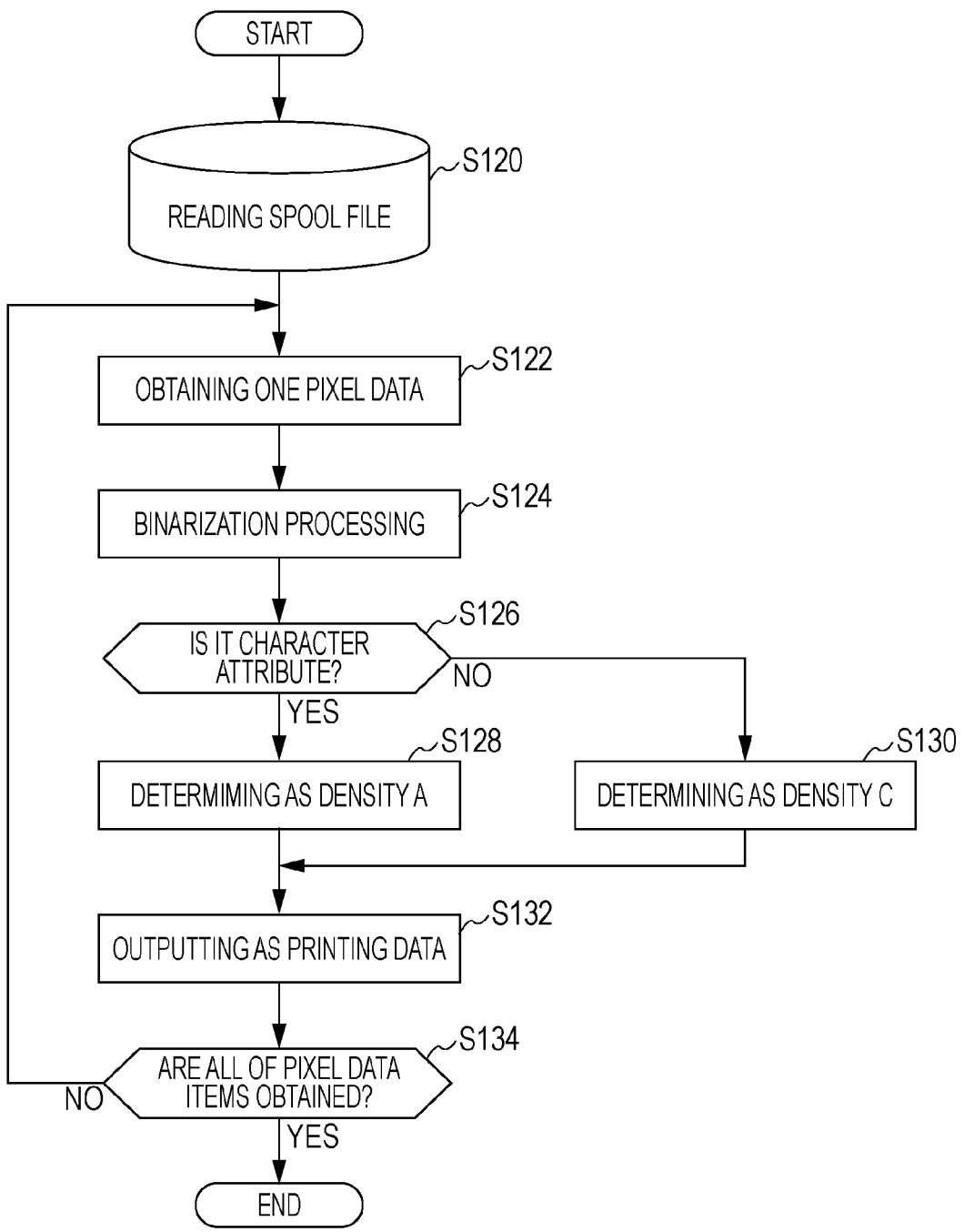
FIG. 5 is a flowchart which shows a flow of a replay process.

FIG. 5 is a flowchart which shows a flow of processing of the replay process unit 38. When the processing is started, the replay process unit 38 reads the spool file (step S120).

Subsequently, the replay process unit 38 obtains data of one pixel from the read out data (step S122).

Subsequently, the replay process unit 38 performs binary processing with respect to the obtained data (step S124).

Subsequently, printing density determining processing is performed, and the replay process unit 38 obtains the attribute information of data of one pixel, and determines whether or not the obtained attribute information is the character attribute (step S126).

Here, when data of one pixel is determined as the character attribute (Yes in step S126), the replay process unit 38 determines the density of data of one pixel as A (step S128).

On the other hand, when it is determined that data of one pixel is not the character attribute (No in step S126), the replay process unit 38 determines the density of data of one pixel as C (step S130).

Subsequently, the replay process unit 38 outputs the density as the printing data so as to be printed with the determined density (step S132).

Subsequently, the replay process unit 38 determines whether or not the entire pixel data is obtained (step S134).

Here, when it is determined that the entire pixel data is not obtained (No in step S134), the procedure returns to step S122, and obtains the next data of one pixel. On the other hand, when it is determined that the entire pixel data is obtained (Yes in step S134), a series of processing of the replay process unit 38 is ended.

The line width, or the size of the character as the reference may be stored in the printing control device as a default value, or may be set by a user.

According to above described embodiments, it is possible to obtain the following effects.

(1) In the ink jet printer 18, it is possible to execute high speed printing processing while suppressing reduction of visibility of an image printed on the sheet 50.

The embodiments of the invention have been described with reference to drawings, however, the specific configuration is not limited to these embodiments, and may also include design changes or the like without departing from the scope of the invention. For example, when the attribute information is an image, the density may be determined as a density which is different from that of the character attribute.

In addition, the device in which the above method is performed may be executed by a single device, or by a combination of a plurality of devices, accordingly, the device includes a variety of types.

What is claimed is:

1. A printing control device comprising:
   a printing density determination unit which obtains attribute information of an object which is included in input document data, and determines a printing density for printing the object according to the line width of an image of the object for which the attribute information is a line drawing attribute.

2. The printing control device according to claim 1,
   wherein the printing density determination unit determines the printing density of the object for which the attribute information is a character attribute as a first density, and
   wherein the printing density determination unit determines the printing density of the entire object for which the attribute information is the line drawing attribute, and the line width thereof is more than a certain value as a second density which is lower than the first density.

3. The printing control device according to claim 2,
   wherein the printing density determination unit determines the printing density of the object for which the attribute information is the line drawing attribute, and the line width does not exceed a certain value as the first density.

4. The printing control device according to claim 3,
   wherein the printing density determination unit rewrites the attribute information of the object for which the attribute information is the line drawing attribute, and the line width does not exceed a certain value to the character attribute from the line drawing attribute.

5. The printing control device according to claim 2,
   wherein the printing density determination unit determines the printing density of the object for which the attribute information is the line drawing attribute, and the line width does not exceed a certain value, as a third density which is lower than the first density, and is higher than the second density.

6. The printing control device according to claim 1,
   wherein an image of the object as the line drawing attribute is a ruled line, an underline of characters, or a strikeout.

7. The printing control device according to claim 2,
   wherein the printing density obtaining unit determines the printing density for printing the object according to a size of the character of the image of the object of which the obtained attribute information is the character attribute.

8. The printing control device according to claim 2,
   wherein the printing density determination unit determines the printing density of the object for which the attribute information is the character attribute, and a size of the character is more than a certain value as the second density.

9. The printing control device according to claim 8,
   wherein the printing density determination unit rewrites the attribute information of the object for which the attribute information is the character attribute, and the size of the character exceeds a certain value to the line drawing attribute from the character attribute.

10. The printing control device according to claim 1,
    wherein the printing density determination unit operates with respect to the document data to be printed on both surfaces of a printing medium.

11. The printing control device according to claim 1,
    wherein the printing density determination unit determines the number of dots, or a size of dots which draw one pixel of the image on the basis of the determined printing density.

12. The printing control device according to claim 1,
    wherein the printing density determination unit includes a gray value setting unit which sets a gray value corresponding to the printing density.

13. The printing control device according to claim 1,
    wherein printing data which can be printed in an ink jet printer is generated.

14. A printing control method comprising:
    obtaining attribute information of an object which is included in input document data;
    obtaining information relating to the line width of an image of the object, when the obtained attribute information is a line drawing attribute; and
    determining a printing density for printing according to the obtained line width.

* * * * *